United States Patent
Watanabe

(10) Patent No.: US 7,361,520 B2
(45) Date of Patent: Apr. 22, 2008

(54) OPTICAL WAVEGUIDE DEVICE AND MANUFACTURING METHOD THEREOF

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/692,519

(22) Filed: Mar. 28, 2007

(65) Prior Publication Data

US 2007/0253670 A1    Nov. 1, 2007

(30) Foreign Application Priority Data

Apr. 28, 2006    (JP) .............................. 2006-127000

(51) Int. Cl.
H01L 21/00 (2006.01)
G02B 6/10 (2006.01)
B29D 11/00 (2006.01)

(52) U.S. Cl. .................. 438/31; 438/29; 385/129; 385/130; 385/132; 385/14; 216/24

(58) Field of Classification Search ................. 385/14, 385/50, 52, 39, 49, 129, 130, 131, 132, 92, 385/94; 438/29, 31
See application file for complete search history.

(56) References Cited

U.S. PATENT DOCUMENTS 5,488,678 A * 1/1996 Taneya et al. ............... 385/14
6,311,004 B1 * 10/2001 Kenney et al. .............. 385/130
6,621,961 B2 * 9/2003 Alibert ......................... 385/52
6,768,855 B1 * 7/2004 Bakke et al. ................ 385/129
6,985,646 B2 * 1/2006 Blauvelt et al. .............. 385/14
2004/0201026 A1 * 10/2004 Gill et al. ...................... 257/79
2007/0253670 A1 * 11/2007 Watanabe ..................... 385/129
2007/0274653 A1 * 11/2007 Watanabe et al. ............ 385/129

FOREIGN PATENT DOCUMENTS

JP    2823044 B2    9/1998

* cited by examiner

Primary Examiner—Brian M. Healy
(74) Attorney, Agent, or Firm—Sughrue Mion, PLLC

(57) ABSTRACT

An optical waveguide device which includes an optical waveguide part and a photonic device mounting part is provided. A mask is patterned after high-temperature annealing to form a pedestal block on which a light emitting device is mounted. Thus, there is no influence on the mask, even if the device undergoes the heat treatment at a high temperature during the manufacturing process. This enables formation of the pedestal block with high accuracy. Therefore, it is possible to achieve an optical coupling with high accuracy in mounting a light emitting device on the pedestal block.

12 Claims, 4 Drawing Sheets

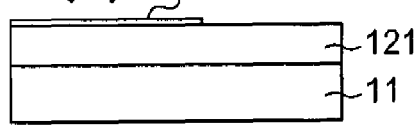
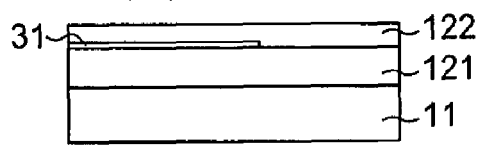
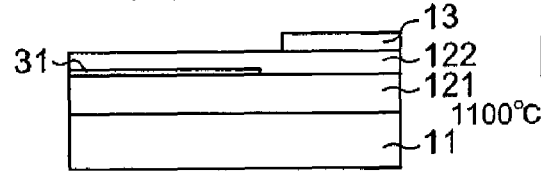
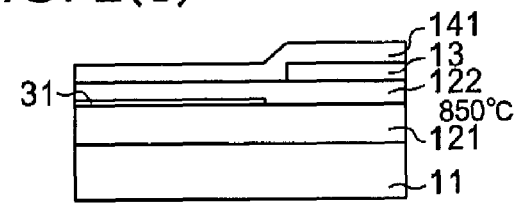
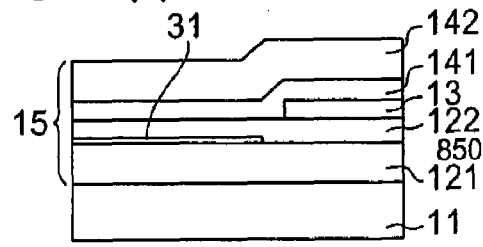
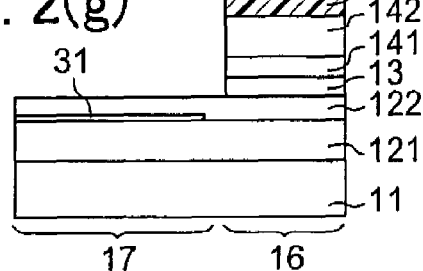
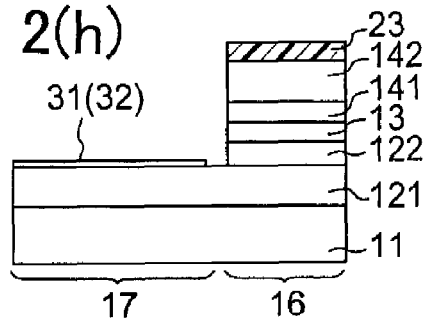
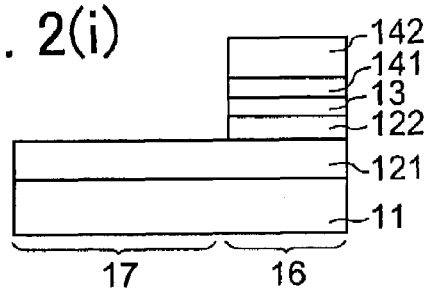
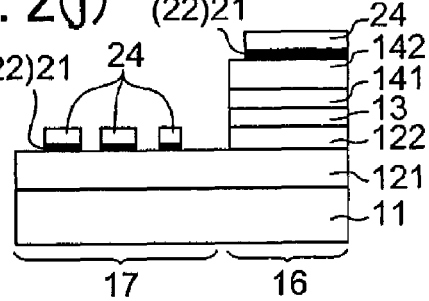
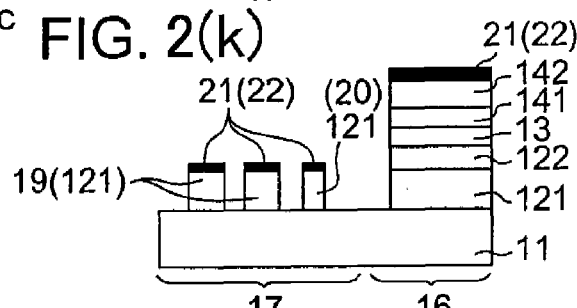
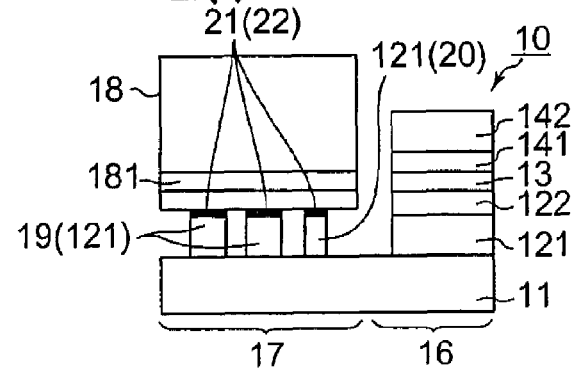

OPTICAL WAVEGUIDE DEVICE AND MANUFACTURING METHOD THEREOF

CROSS-REFERENCE TO RELATED APPLICATION

This application claims priority from Japanese Patent Application No. 2006-127000, filed on Apr. 28, 2006, in the Japanese Patent Office, the disclosure of which is hereby incorporated by reference in its entirety.

BACKGROUND OF THE INVENTION

1. Field of the Invention

Apparatuses and manufacturing methods consistent with the present invention relate to an optical waveguide device which includes an optical waveguide part and a optical device mounting part on a substrate.

2. Description of the Related Art

Optical transceivers used in an optical access market are broadly divided into a microoptics type module composed of an laser diode (LD), a photo detector (PD), a thin film filter, and a lens, and a planar lightwave circuit (PLC) type module configured by making a silica waveguide on a silicon substrate and surface-mounting an LD and a PD. While both of them have merits and demerits, the latter is more advantageous in terms of cost and delivery, because it does not require optical axis adjustment. This mounting method which does not require optical axis adjustment is generally called a "passive alignment mounting". In passive alignment mounting, a planar position of an optical component against an optical waveguide chip is determined by performing image detection and recognition of alignment markers provided to both of them with infrared transmitted light. A vertical position of the optical component is determined by the height of a block called a pedestal. Because the pedestal height can be made with high accuracy, it is possible to match the height with an optical waveguide with high accuracy by mounting the optical component on the pedestal.

This kind of optical waveguide device is disclosed in Japanese Patent Number 2,823,044. FIG. 3 is an exploded perspective view showing a related art optical waveguide device disclosed in this patent. In FIG. 3, an optical waveguide device 50 includes an optical waveguide part 56, which consists of an optical waveguide forming layer 55 with lower cladding layers 521 and 522, a core layer 53, and an upper cladding layer 54 formed on a silicon substrate 51. The optical waveguide device 50 also includes a photonic device mounting part 57, which is configured by eliminating a part of the optical waveguide forming layer 55. A light emitting device 58 mounted on the photonic device mounting part 57 is optically connected to an end face of the optical waveguide part 56, which is exposed by the elimination of a part of the optical waveguide forming layer 55.

The photonic device mounting part 57 includes a pedestal block 59, an alignment marker 60 consisting of a lower cladding layer 521, a pedestal block forming mask 62 consisting of a chromium (Cr) film 61 provided on the pedestal block 59, and the light emitting device 58 which contacts the mask 62. The lower cladding layers 521 and 522, the core layer 53, and the upper cladding layer 54 are atmospheric chemical vapor deposition (CVD) films.

In other words, the optical waveguide device 50 is a result of surface-mounting the light emitting device 58 on a PLC chip with an optical waveguide circuit.

FIG. 4 shows sectional views of a method of manufacturing the optical waveguide device of FIG. 3, where the operations proceed in order of FIG. 4(a) to FIG. 4(h). Hereinafter, an explanation will be given based on FIG. 3 and FIG. 4.

In FIG. 4(a), the lower cladding layer 521 is film-formed as a first layer on the silicon substrate 51.

In FIG. 4(b), the chromium film 61, which later becomes a mask for forming the pedestal block, is patterned on the lower cladding layer 521. Here, the chromium film 61, which becomes a mask for forming the alignment marker required for mounting the light emitting device 58, is patterned simultaneously.

In FIG. 4(c), the lower cladding layer 522 is film-formed as a second layer.

In FIG. 4(d), the core layer 53, which becomes a core of the optical waveguide part 56, is deposited on the lower cladding layer 522, and the waveguide is patterned by dry etching.

In FIG. 4(e), an upper cladding layer 541 is deposited as the first layer for embedding the core layer 53 and reflow-processed at a high temperature. The upper cladding layer 541 consists of a low melting film. The temperature of the reflow process is generally 800° C. to 900° C.

In FIG. 4(f), an upper cladding layer 542 is film-formed as the second layer to complete a waveguide structure.

In FIG. 4(g), a chromium film 63 and a photoresist film 64 are deposited, and are patterned so that only the chromium film 63 remains on the optical waveguide forming layer 55 as the optical waveguide part 56. Lastly, the end face of the core layer 53 is exposed by dry etching by using the chromium film 63 as an etching mask. Also, the pedestal block 59 and alignment marker 60 are formed by using the patterned chromium film 61 as the mask 62 to complete the optical waveguide device.

Thereafter, elimination of the chromium film, and film formation and patterning of an insulating film and an electrode metal are performed as required. For instance, the chromium film 63 is eliminated in FIG. 4(h).

In the optical waveguide device 50, the height of the core layer 53 of the optical waveguide part 56 and the pedestal block 59 is only controlled by the accuracy of a film formation apparatus. The accuracy of the film formation apparatus is around 1%, due to variations in a wafer surface. Therefore, when the film thickness of the lower cladding layer 522 is 1.5 μm, a gap in height between the core layer 53 and the pedestal block 59 is only 15 nm. Thus, it is possible to perform optical coupling with high accuracy without performing optical axis adjustment, by adjusting a horizontal direction with the alignment marker 60, and mounting the light emitting device 58 on the pedestal block 59. More specifically, an active layer 581 of the light emitting device 58 and the core layer 53 become opposed with high accuracy. Incidentally, in FIG. 4, a heat treatment temperature of each individual operation is indicated.

The film made by the plasma CVD can have a high refractive index, and so it is possible to increase a refractive index difference between a core and a cladding, to significantly improve the flexibility in design. However, a thin film formed by the plasma CVD requires a heat treatment at a high temperature, normally around 1,100° C.

In the optical waveguide device 50, the core layer 53 is the atmospheric CVD film as previously described. This is because, if the core layer 53 is a plasma CVD film, the chromium film 61 is oxidized by the heat treatment at a high temperature, and the pedestal block forming mask 62 no longer functions correctly.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An optical waveguide device is described that is capable of forming the core layer by plasma CVD, and making the pedestal block with high accuracy, even when a heat treatment at a high temperature is required.

According to an aspect of the present invention, there is provided an optical waveguide device, which comprises an optical waveguide part and a photonic device mounting part. The optical waveguide part comprises an optical waveguide forming layer having a lower cladding layer, a core layer, and an upper cladding layer formed on a substrate. The photonic device mounting part is configured by eliminating a part of the optical waveguide forming layer. The photonic device mounted on the photonic device mounting part is optically connected to an end face of the optical waveguide part, which is exposed by the elimination of a part of the optical waveguide forming layer. In the photonic device mounting part, the core layer and upper cladding layer are eliminated. The photonic device mounting part includes the part of the lower cladding layer which remains, and a mask consisting of a thin film provided on the lower cladding layer. The photonic device contacts the mask. The mask functions as an etching mask to keep part of the lower cladding layer. At least the core layer consists of a plasma CVD film.

Because the core layer consists of the plasma CVD film, a refractive index of the core can be high. Thus, it is possible to increase a refractive index difference between the core and the cladding, and significantly improve the flexibility in designing an optical waveguide. The plasma CVD film may be annealed after film formation at 1,000° C. or over, preferably 1,100° C. or over, and most desirably 1,200° C. or over. In this case, the refractive index of the core can be increased.

There is no limitation on the layers configuring the lower cladding layer. For example, it may consist of deposited first and second layers. In this case, the photonic device mounting part has the second layer, and the core layer and upper cladding layer are eliminated. Also, the photonic device mounting part includes the first layer, which is partially left, and a mask consisting of a thin film provided on the first layer. The mask functions as an etching mask to partially leave the first layer.

According to another aspect of the present invention, a method of manufacturing an optical waveguide device with an optical waveguide part and a photonic device mounting part is provided. The optical waveguide part comprises an optical waveguide forming layer having a lower cladding layer, a core layer, and an upper cladding layer formed on a substrate. The photonic device mounting part is formed by eliminating a part of the optical waveguide forming layer. The photonic device mounted on the photonic device mounting part is optically connected to an end face of the optical waveguide part, which is exposed by the elimination of a part of the optical waveguide forming layer. The method comprises the following first to seventh operations.

In the first operation, the lower cladding layer is formed on the substrate. In the second operation, the etching stop layer which comprises a first thin film is formed on a portion to become the photonic device mounting part. In the third operation, the core layer is formed on a portion to become the optical waveguide part. In the fourth operation, the upper cladding layer is formed on a portion to become the photonic device mounting part, and on a portion to become the optical waveguide part. In the fifth operation, the upper cladding layer is eliminated by using the etching stop layer in the portion to become the photonic device mounting part. In the sixth operation, the mask which comprises a second thin film is formed on the etching stop layer or on a location of the etching stop layer after eliminating the etching stop layer. In the seventh operation, the lower cladding layer is eliminated by using the mask in the portion to become the photonic device mounting part.

As for the second thin film to be the mask, the core layer and upper cladding layer on the etching stop layer are eliminated, and the etching stop layer is eliminated as required, and then the second thin film is formed thereon. Therefore, there is no influence on the second thin film, even if the lower cladding layer and core layer undergo a heat treatment at a high temperature before forming the second thin film. The lower cladding layer under the etching stop layer or under the mask which determines the height accuracy of a pedestal block is constantly protected by the etching stop layer or the mask during the manufacturing process. Therefore, it is possible to make the pedestal block with high accuracy without damaging the functions of the mask, even when a heat treatment at a high temperature is required.

It is also possible to form at least the core layer by plasma CVD in the first operation and the third operation. The method may also include a operation of annealing the lower cladding layer and the core layer at 1,000° C. or over, preferably 1,100° C. or over, and most desirably 1,200° C. or over before the sixth operation. For instance, the lower cladding layer and the core layer are deposited on the substrate by plasma CVD, the optical waveguide part is formed by dry etching, and the lower cladding layer and the core layer are annealed at 1,000° C. or over, and then the upper cladding layer is formed on the core layer. In this case, the annealing may also be performed after film formation of the core layer, as well as after film formation of the lower cladding layer.

Furthermore, the lower cladding layer may consist of deposited first and second layers. In this case, the first layer is formed on the substrate in the first operation. In the third operation, the second layer is formed on the portion to become the photonic device mounting part and on the portion to become the optical waveguide part, and then the core layer is formed on the portion to become the optical waveguide part. In the fifth operation, the second layer and the upper cladding layer are eliminated by using the etching stop layer in the portion to become the photonic device mounting part. In the seventh operation, the first layer is eliminated by using the mask in the portion to become the photonic device mounting part. Thus, it is possible to form the lower cladding layer which contacts the core layer separately from the lower cladding layer for providing the etching stop layer thereon. A major reason for providing the two lower cladding layers is to match the height of an active layer of the photonic device with the height of the core layer of the optical waveguide part. Furthermore, an error of the height can be rendered smaller, because the height accuracy of the active layer of the photonic device and the core layer of the optical waveguide part is only determined by the film thickness accuracy of the second layer.

At least one of the upper cladding layers may consist of an atmospheric CVD film. Because there is no need to increase the refractive index of a cladding, it is possible to use atmospheric CVD film, for which the heat treatment temperature is relatively low, to avoid generation of wasteful thermal stress. Furthermore, this should preferably be a quartz film, such as a Boro-phospho silicate glass (BPSG) film with a low melting point and a dopant, such as boron or phosphorous. Using the BPSG film reduces the thermal stress and facilitates embedding of the core. It also improves flatness and thereby facilitates post-process patterning.

In other words, according to exemplary embodiments of the present invention, it is possible to make a pedestal with high accuracy, even after a necessary high-temperature treatment, by using a material which is highly heat-resistant and has a high etching selectivity with an oxide film as an etching mask for forming the pedestal.

According to exemplary embodiments of the present invention, the core layer consists of the plasma CVD film, so that the refractive index of the core can be rendered high. Therefore, it is possible to increase the refractive index difference between the core and the cladding, to significantly improve the flexibility in designing an optical waveguide.

According to exemplary embodiments of the present invention, the core layer and upper cladding layer on the etching stop layer are eliminated, and the etching stop layer is eliminated as required, and then the second thin film which becomes the mask is formed thereon. Therefore, there is no influence on the second thin film, even if the lower cladding layer and core layer undergo a heat treatment at a high temperature before forming the second thin film. The lower cladding layer under the etching stop layer or the mask which decides height accuracy of a pedestal block is constantly protected by the etching stop layer or the mask during the manufacturing process. Therefore, it is possible to make the pedestal block with high accuracy without damaging the functions of the mask, even when a heat treatment at a high temperature is required.

BRIEF DESCRIPTION OF THE DRAWINGS

The above and other aspects of the present invention will become more apparent by describing in detail exemplary embodiments thereof with reference to the accompanying drawings, in which:

FIG. 2(a) to FIG. 2(l) is a sectional view showing a method of manufacturing the optical waveguide device according to an exemplary embodiment of the present invention;

DETAILED DESCRIPTION OF EXEMPLARY EMBODIMENTS OF THE PRESENT INVENTION

Figure 1:
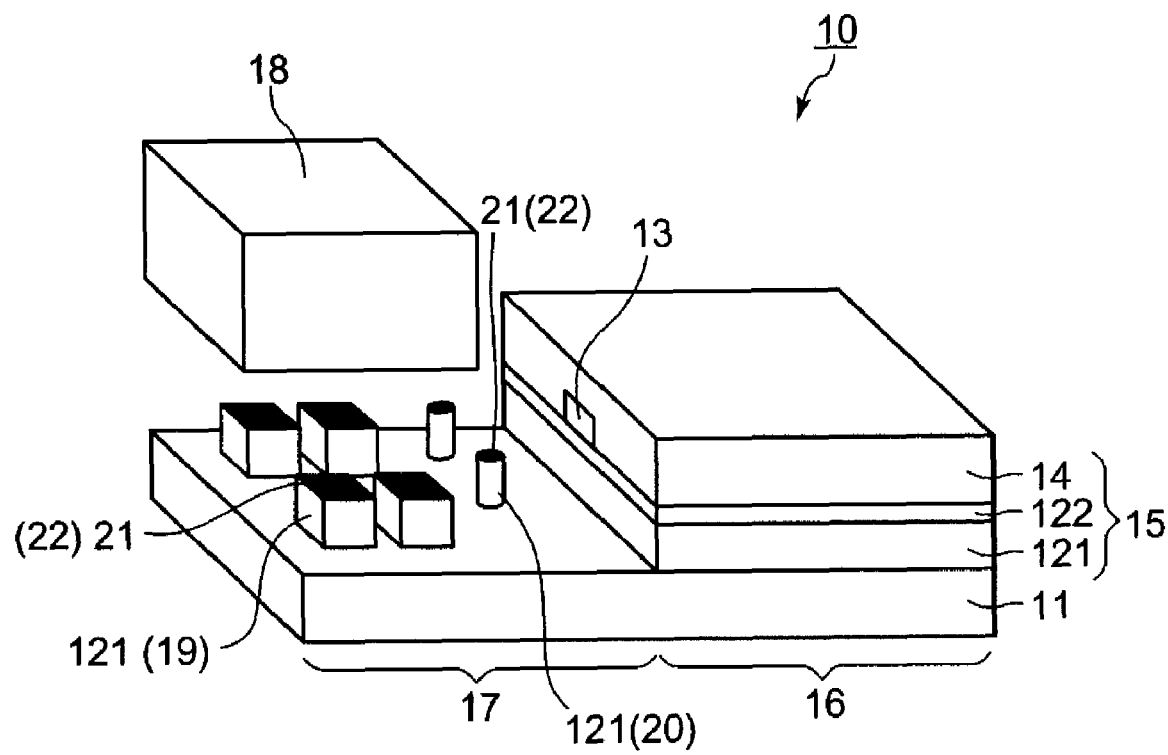
FIG. 1 is an exploded perspective view showing an embodiment of an optical waveguide device according to an exemplary embodiment of the present invention.
Figure 3:
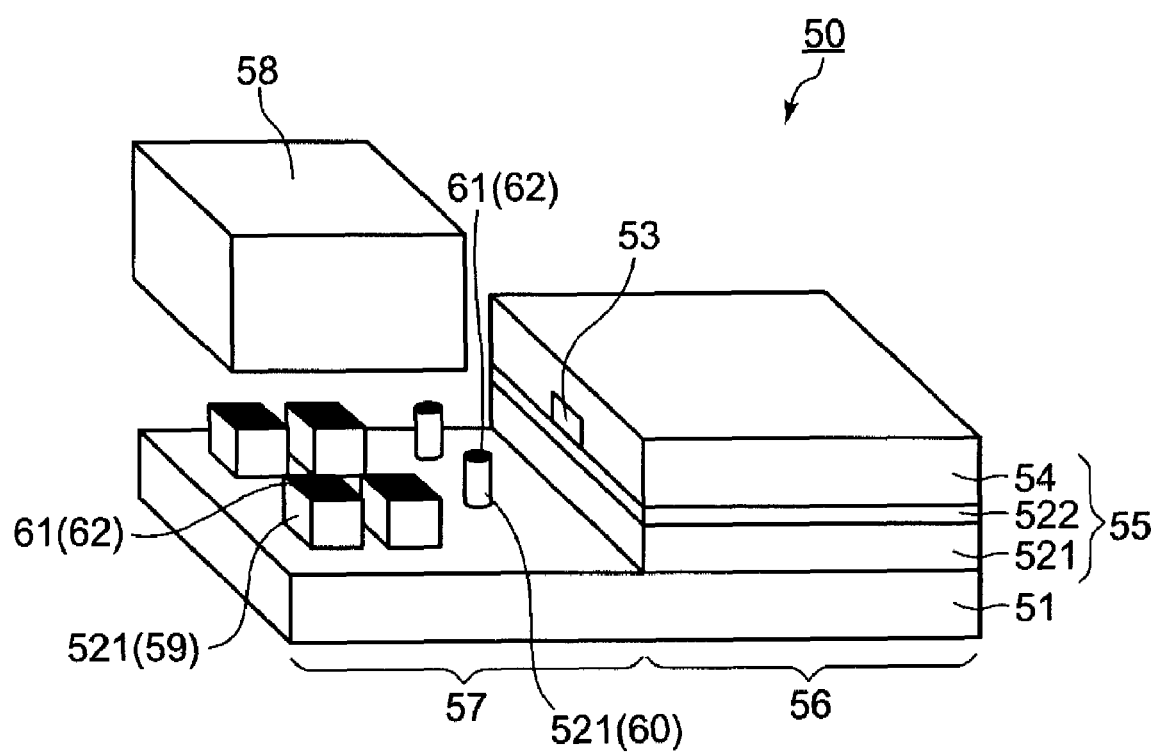
FIG. 3 is an exploded perspective view showing a related art optical waveguide device; and FIG. 4(a) to FIG. 4(h) is a sectional view showing the method of manufacturing the related art optical waveguide device of FIG. 3.
Figure 4A:
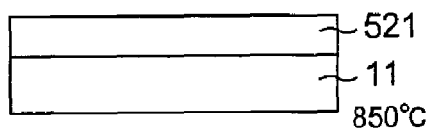
Figure 4B:
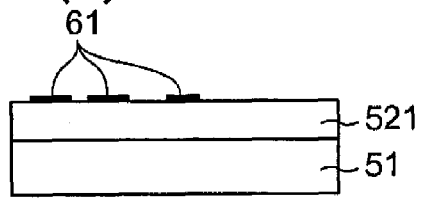
Figure 4C:
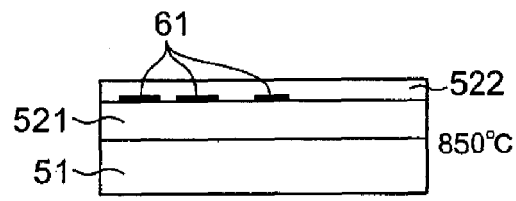
Figure 4D:
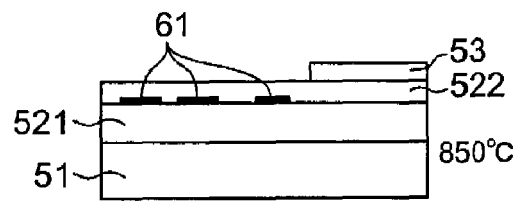
Figure 4E:
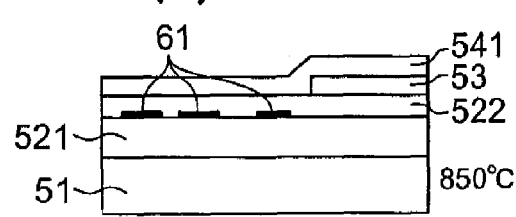
Figure 4F:
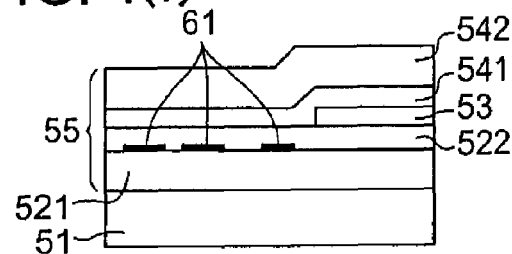
Figure 4G:
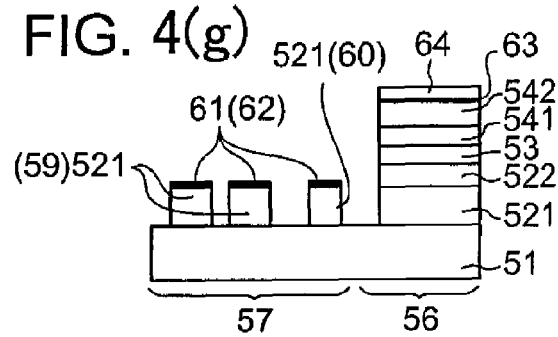
Figure 4H:
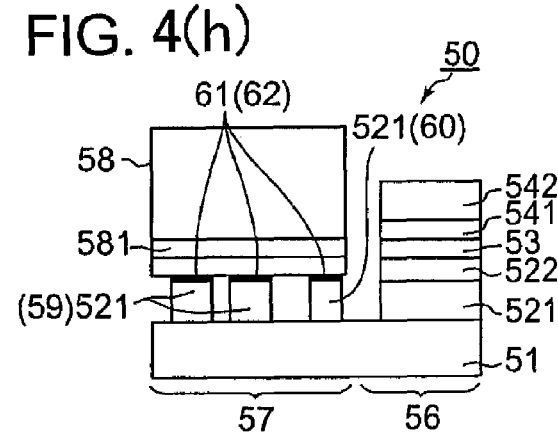

FIG. 1 is an exploded perspective view showing an optical waveguide device according to an exemplary embodiment of the present invention.

FIG. 1 shows that an optical waveguide device 10 comprises an optical waveguide part 16, which includes an optical waveguide forming layer 15 with lower cladding layers 121 and 122, a core layer 13, and an upper cladding layer 14 formed on a silicon substrate 11. The optical waveguide device 10 also includes a photonic device mounting part 17 formed by eliminating a part of the optical waveguide forming layer 15. A light emitting device 18, which is mounted on the photonic device mounting part 17, is optically connected to an end face of the optical waveguide part 16, which is exposed by the elimination of a part of the optical waveguide forming layer 15.

The photonic device mounting part 17 comprises a pedestal block 19, an alignment marker 20, and a mask 22. The pedestal block 19 and the alignment marker 20 consist of the partially remaining lower cladding layer 121. In the upper part of the pedestal block 19 and the alignment marker 20, the lower cladding layer 122, the core layer 13, and the upper cladding layer 14 are eliminated. The mask 22 comprises a chromium film 21 provided on the lower cladding layer 121. The light emitting device 18 contacts the mask 22. The mask 22 functions as an etching mask to partially leave the lower cladding layer 121.

The lower cladding layers 121 and 122 and the core layer 13 consist of a plasma CVD film. The plasma CVD film is annealed at 1,000° C. or over after the film formation. By using this film, it is possible to increase a refractive index difference between the core layer 13 and the lower cladding layer 122. Therefore, a flexibility in designing an optical waveguide is significantly improved.

FIG. 2 shows a method of manufacturing the optical waveguide device of FIG. 1, where the operations proceed in order of FIG. 2(a) to FIG. 2(l). Hereinafter, an explanation according to an exemplary embodiment of the present invention will be given based on FIG. 1 and FIG. 2.

In FIG. 2(a), the lower cladding layer 121 is formed as a first layer on the silicon substrate 11 by a plasma CVD. If necessary, a high-temperature annealing process at about 1,100° C. can be performed after the formation of the layer.

In FIG. 2(b), a SiN film 31, which later becomes an etching stop layer 32, is formed on the lower cladding layer 121 by the plasma CVD. Subsequently, the SiN film 31 is patterned, to leave the SiN film 31 in an area for mounting the light emitting device 18. For instance, a thermal phosphoric acid can be used as an etchant in this case. The reason for using SiN is that it is highly heat-resistant, and has high selectivity with SiO2 in wet etching with a hydrofluoric acid mixture, such as a buffered hydrofluoric acid ($NH_4F$/HF/$H_2O$). However, because the stress of the SiN film is generally very high, it is important to reduce the stress by patterning it once in this operation. Another reason for using SiN is that it can also be formed by the plasma CVD. It is also possible to use a SiON film of which N substitution is large, instead of the SiN film.

In FIG. 2(c), the lower cladding layer 122 is formed as a second layer by the plasma CVD. If necessary, a high-temperature annealing process at about 1,100° C. can be performed after the formation of the layer.

In FIG. 2(d), a SiON film, which becomes the core layer 13, is deposited by the plasma CVD again, and the waveguide is patterned on the core layer 13 by dry etching. Thereafter, the high-temperature annealing process at about 1,100° C. may be performed. The high-temperature annealing process may be performed before patterning the waveguide if the thermal stress is not problematic.

In FIG. 2(e), an upper cladding layer 141 is deposited as the first layer for embedding the core layer 13. The upper cladding layer 141 is then reflow-processed at about 850° C. to embed the core layer 13. The upper cladding layer 141 may be a low melting film, such as BPSG film.

In FIG. 2(f), an upper cladding layer 142 is formed as the second layer to complete the optical waveguide forming layer 15.

In FIG. 2(g), a photoresist film 23 is formed on the optical waveguide forming layer 15, which becomes the optical waveguide part 16. The silicon dioxide films, including the lower cladding layer 122, the core layer 13, and the upper cladding layer 14 on the etching stop layer 32, are eliminated by dry etching. However, because the selectivity of SiN with SiO$_2$ is low, it would be preferable to perform dry etching performed up to a state where a little SiO$_2$ is left. Reactive Ion Etching (RIE) is suitable for this dry etching.

In FIG. 2(h), the remaining SiO$_2$ is eliminated by wet etching of a hydrofluoric acid mixture, such as a buffered hydrofluoric acid, by using the SiN film 31 as the etching stop layer. Thus, the portion to become the photonic device mounting part 17 is clearly separated from the portion to become the optical waveguide part 16.

In FIG. 2(i), the SiN film 31 used as the etching stop layer is eliminated by the thermal phosphoric acid. This is to prevent a deterioration of the height accuracy of the pedestal block 19. This is because the SiN film 31 is etched a little in FIG. 2(h) and the amount of the etching of the SiN film 31 cannot be controlled.

In FIG. 2(j), the mask 22 for forming the pedestal block 19 is formed by depositing the chromium film 21 and a photoresist film 24 on the exposed lower cladding layer 121 and patterning the chromium film 21. The mask 22 for forming the alignment marker 20, which is required when mounting the light emitting device 18, is simultaneously formed. In addition, the chromium film 21 is simultaneously patterned as an etching mask for forming the end face of the core layer 13.

In FIG. 2(k), the end face of the core layer 13 is newly exposed by dry etching by using the chromium film 21 patterned in FIG. 2(j) as an etching mask. Also, the pedestal block 19 and the alignment marker 20 are simultaneously formed. To achieve accurate etching, an etching rate of the chromium film 21 should desirably be 1/10 or less of the etching rate of the lower cladding layer 121. The reactive ion etching (RIE) is suitable for this dry etching.

In FIG. 2(l), the light emitting device 18 is mounted on the mask 22 of the pedestal block 19 to set an active layer 181 of the light emitting device 18 and the core layer 13 opposed, and to complete the optical waveguide device 10. In this case, the chromium film may be eliminated, and an insulating film or an electrode metal may be formed and patterned as required. For example, in FIG. 2(l), the chromium film 21 on the optical waveguide part 16 is eliminated. Incidentally, in FIG. 2, the heat treatment temperature of each individual operation is indicated.

As described above, the apparatus and manufacturing method for providing an optical waveguide device according to exemplary embodiments of the present invention can obtain the following effects. The chromium film 21, which becomes the mask 22, is formed on the lower cladding layer 121 after the lower cladding layer 122, the core layer 13, the upper cladding layer 14, and the etching stop layer 32 are eliminated. Therefore, there is no influence on the chromium film 21, even if the lower cladding layers 121 and 122 and the core layer 13 undergo the heat treatment at a high temperature before forming the chromium film 21. The lower cladding layer 121, which determines the height accuracy of the pedestal block. 19, is protected by the etching stop layer 32 or the mask 22 during the manufacturing process. Therefore, it is possible to make the pedestal block 19 with high accuracy without damaging the functions of the mask 22, even when a heat treatment at a high temperature is required.

In other words, according to exemplary embodiments of the present invention, the chromium film 21, which becomes the mask 22, is patterned after the high-temperature annealing process to form the pedestal block 19. Therefore, it becomes possible to make the pedestal block 19 with high accuracy.

While exemplary embodiments of the present invention have been described above, it is to be understood that numerous modifications to the exemplary embodiments of the invention will be apparent to those skilled in the art without departing from the spirit and scope of the present invention, as defined in the following claims and their legal equivalents.

What is claimed is:

1. A method of manufacturing an optical waveguide device which comprises a waveguide part and a photonic device mounting part, said method comprising:
   forming a lower cladding layer on a substrate;
   forming an etching stop layer on said photonic device mounting part;
   forming a core layer on said optical waveguide part;
   forming a upper cladding layer on said photonic device mounting part and on said optical waveguide part;
   eliminating said upper cladding layer by using said etching stop layer as an etching stop mask;
   forming a mask on said etching stop layer; and
   eliminating said lower cladding layer and said etching stop layer partially in said photonic device mounting part by using said mask as an etching mask.

2. The method of manufacturing an optical waveguide device according to claim 1, wherein at least said core layer is formed by plasma chemical vapor deposition (CVD).

3. The method of manufacturing an optical waveguide device according to claim 2, further comprising annealing at least said core layer at not less than 1,000° C. before said forming said mask.

4. A method of manufacturing an optical waveguide device which comprises a waveguide part and a photonic device mounting part, said method comprising:
   forming a lower cladding layer on a substrate;
   forming an etching stop layer on said photonic device mounting part;
   forming a core layer on said optical waveguide part;
   forming a upper cladding layer on said photonic device mounting part and on said optical waveguide part;
   eliminating said upper cladding layer by using said etching stop layer as an etching stop mask;
   eliminating said etching stop layer;
   forming a mask on a portion from which said etching stop layer was eliminated; and
   partially eliminating said lower cladding layer in said photonic device mounting part by using said mask as an etching mask.

5. The method of manufacturing an optical waveguide device according to claim 3, wherein at least said core layer is formed by plasma chemical vapor deposition (CVD).

6. The method of manufacturing an optical waveguide device according to claim 5, further comprising annealing at least said core layer at not less than 1,000° C. before said forming said mask.

7. A method of manufacturing an optical waveguide device which comprises a waveguide part and a photonic device mounting part, said method comprising:
   forming a first lower cladding layer on a substrate;

forming an etching stop layer on said photonic device mounting part;

forming a second lower cladding layer on said photonic device mounting part and on said optical waveguide part;

forming a core layer on said optical waveguide part;

forming a upper cladding layer on said photonic device mounting part and on said optical waveguide part;

eliminating said upper cladding layer and said second lower cladding layer by using said etching stop layer as an etching stop mask;

forming a mask on said etching stop layer; and partially eliminating said first lower cladding layer and said etching stop layer in said photonic device mounting part by using said mask as an etching mask.

8. The method of manufacturing an optical waveguide device according to claim 7, wherein at least said core layer is formed by plasma chemical vapor deposition (CVD).

9. The method of manufacturing an optical waveguide device according to claim 8, further comprising annealing at least said core layer at not less than 1,000° C. before said forming said mask.

10. A method of manufacturing an optical waveguide device which comprises a waveguide part and a photonic device mounting part, said method comprising:

forming a first lower cladding layer on a substrate;

forming an etching stop layer on said photonic device mounting part;

forming a second lower cladding layer on said photonic device mounting part and on said optical waveguide part;

forming a core layer on said optical waveguide part;

forming a upper cladding layer on said photonic device mounting part and on said optical waveguide part;

eliminating said upper cladding layer and said second lower cladding layer by using said etching stop layer as an etching stop mask;

eliminating said etching stop layer;

forming a mask on a portion from which said etching stop layer was eliminated; and partially eliminating said lower cladding layer in said photonic device mounting part by using said mask as an etching mask.

11. The method of manufacturing an optical waveguide device according to claim 10, wherein at least said core layer is formed by plasma chemical vapor deposition (CVD).

12. The method of manufacturing an optical waveguide device according to claim 11, further comprising annealing at least said core layer at not less than 1,000° C. before said forming said mask.

* * * * *